United States Patent
Häfner

(10) Patent No.: US 7,581,659 B2
(45) Date of Patent: Sep. 1, 2009

(54) DOSING DEVICE

(75) Inventor: Hans Wilhelm Häfner, Aichach-Walchshofen (DE)

(73) Assignee: Pfister GmbH, Ausburg (DE)

( * ) Notice: Subject to any disclaimer, the term of this patent is extended or adjusted under 35 U.S.C. 154(b) by 696 days.

(21) Appl. No.: 10/467,725

(22) PCT Filed: Feb. 8, 2002

(86) PCT No.: PCT/EP02/01335

§ 371 (c)(1),
(2), (4) Date: Jun. 4, 2004

(87) PCT Pub. No.: WO02/065067

PCT Pub. Date: Aug. 22, 2002

(65) Prior Publication Data

US 2004/0234917 A1    Nov. 25, 2004

(30) Foreign Application Priority Data

Feb. 10, 2001 (DE) ............... 101 06 798

(51) Int. Cl.
*B67D 5/08* (2006.01)

(52) U.S. Cl. .......... 222/55; 222/77; 222/367; 222/368

(58) Field of Classification Search ........ 222/55, 222/77, 367, 636, 368; 406/66; 403/66, 403/65
See application file for complete search history.

(56) References Cited

U.S. PATENT DOCUMENTS 4,528,848 A * 7/1985 Hafner ............ 73/218

FOREIGN PATENT DOCUMENTS

WO    WO 98/50764    11/1998

OTHER PUBLICATIONS

Kloven, A Novel, Gravimetric Feeder For Power and Granular Products, Oct. 26-29, 1970, p. 817.*

* cited by examiner

*Primary Examiner*—Frederick C. Nicolas
(74) *Attorney, Agent, or Firm*—Knobbe, Martens, Olson & Bear, LLP

(57) ABSTRACT

The aim of the invention is to provide a dosing device for improved measuring accuracy during the continuous gravimetric dosing of bulk material, in particular combustibles in pulverulent form. To achieve this, two dosing rotors (3, 33) are arranged on the same axis, one above the other, with intermediate or discharge openings (7, 37) being arranged in an offset manner.

10 Claims, 3 Drawing Sheets

DOSING DEVICE

RELATED APPLICATIONS

This application is a national phase application of PCT/EP02/01335 filed Feb. 8, 2002 and claims the benefit of German Application No. 101067984 filed Feb. 10, 2001.

BACKGROUND OF THE INVENTION

1. Field of the Invention

The invention relates to a dosing apparatus for the continuous gravimetric dosing of bulk material with a stream of material being conveyed with a first dosing rotor driven about a swiveling axis under determination of the momentary load over a measuring section from a charge opening to an offset discharge opening, and with a load-sensing apparatus which detects the momentary load of the stream of material guided over the measuring section.

2. Description of the Related Art

Such a dosing apparatus is known from WO 98/50764 of the Applicant. A dosing rotor is provided in particular for rotary tubular kiln firing in the cement burning process, which dosing rotor is subdivided into a plurality of chambers by substantially radially extending driving webs.

Although this apparatus is especially suitable for dosing coarse-grain bulk material, there may be problems in the case of finer or powdery bulk materials during the discharging and filling of downstream conveying devices because so-called "shooting" may occur in such bulk material (i.e. an uncontrolled conveyance), especially when the bulk material is fluidized in the bunker and, as a result, there is a higher pressure at the input side of the dosing apparatus than at the discharge side. Such phenomena between the revolving rotor and the stationary housing parts cause disturbances in the conveyance and considerable imprecision in the dosing. Moreover, the entrainment volume of the rotor is thus relatively low, unless an especially large rotor diameter or higher revolving speeds of the rotor are provided.

SUMMARY OF THE INVENTION

The invention is thus based on the object of improving a dosing apparatus of this kind with respect to the possible throughput and the measurement precision.

This object is achieved with a dosing apparatus for the continuous, gravimetric dosing of bulk material, with a stream of material being conveyed with a first dosing rotor driven about a swiveling axis under determination of the momentary load over a measuring section from a charge opening to an offset discharge opening, and with a load-sensing apparatus which detects the momentary load of the stream of material guided over the measuring section, characterized in that at least one second dosing rotor is arranged on the same axis with a discharge opening which is offset to an intermediate opening.

As a result of arranging a second (and optionally also a third or fourth) dosing rotor on the same axis in a housing with mutually offset discharge openings, an uncontrolled "shooting" of the conveyed bulk material is inhibited because the stream of material flowing through the dosing apparatus is guided over a longer measuring path, such as of 360° (or optionally even more). Moreover, a controlled pressure decrease is thus achieved, especially when different housing volumes are applied to the two dosing rotors, namely that the housing volume is larger on the second (and optionally following) dosing rotor than in the first one. A similar effect can be achieved when the second dosing rotor is driven with a higher revolving speed than the rotor which is the first in the conveying direction. In this way it is possible to dose powdery bulk materials in a highly precise fashion, especially for use as fuels in rotary tubular kilns in the production of cement or even for cement bagging. As a result of this conveyance over 360° in two (or more) offset planes an increased short-and long-term precision is achieved in total because the material which is situated in the relatively long dosing path is detected several times in a gravimetric manner and accordingly the respective follow-up conveyance from the storage reservoir can be controlled in a more precise manner.

In a preferred embodiment, the upper dosing rotor is tightly fit into the housing in order to achieve the desired sealing effect, whereas the lower (and thus pressure-relieved) dosing rotor can revolve with a large gap dimension to its cover surface (intermediate wall of the housing). The measured section extending over two (or more) planes up to the second discharge opening is preferably guided over an angle of approx. 360°, even though in the case of three or four dosing rotors it is possible to provide measuring sections over 540° or 720° for example if so required by the material or the pressure conditions. The discharge can already occur after 270° or 180° when the intermediate opening between the two rotors is arranged at 90° or 120° angle of rotation from the charge opening.

In a favorable further development, the dosing rotors are provided with their driving webs with the same arrangement for reasons of standardization, so that the train of bulk material can be conveyed with reduced tendency towards "shooting" during the rotary movement.

BRIEF DESCRIPTION OF THE DRAWINGS

An embodiment is explained below in closer detail by reference to the enclosed drawings, wherein:

FIG. 1 shows a dosing apparatus 1 which comprises two superimposed dosing rotors 3 and 33 (cf. FIG. 3) which revolve in a housing 4 which is substantially enclosed with the exception of a charge opening 5 and a discharge opening 37 which is situated below the same. The charge opening 5 and the discharge opening 37 (cf. FIGS. 2 and 3) are situated above one another, thus leading to a measuring section 2 which is longer, is indicated with a dot-dash line and results in a section which is approx. 360° in this case. An intermediate opening 7 is provided here between the two chambers of the dosing rotors 3 and 33 at an angle of rotation of 180°.

Figure 1:
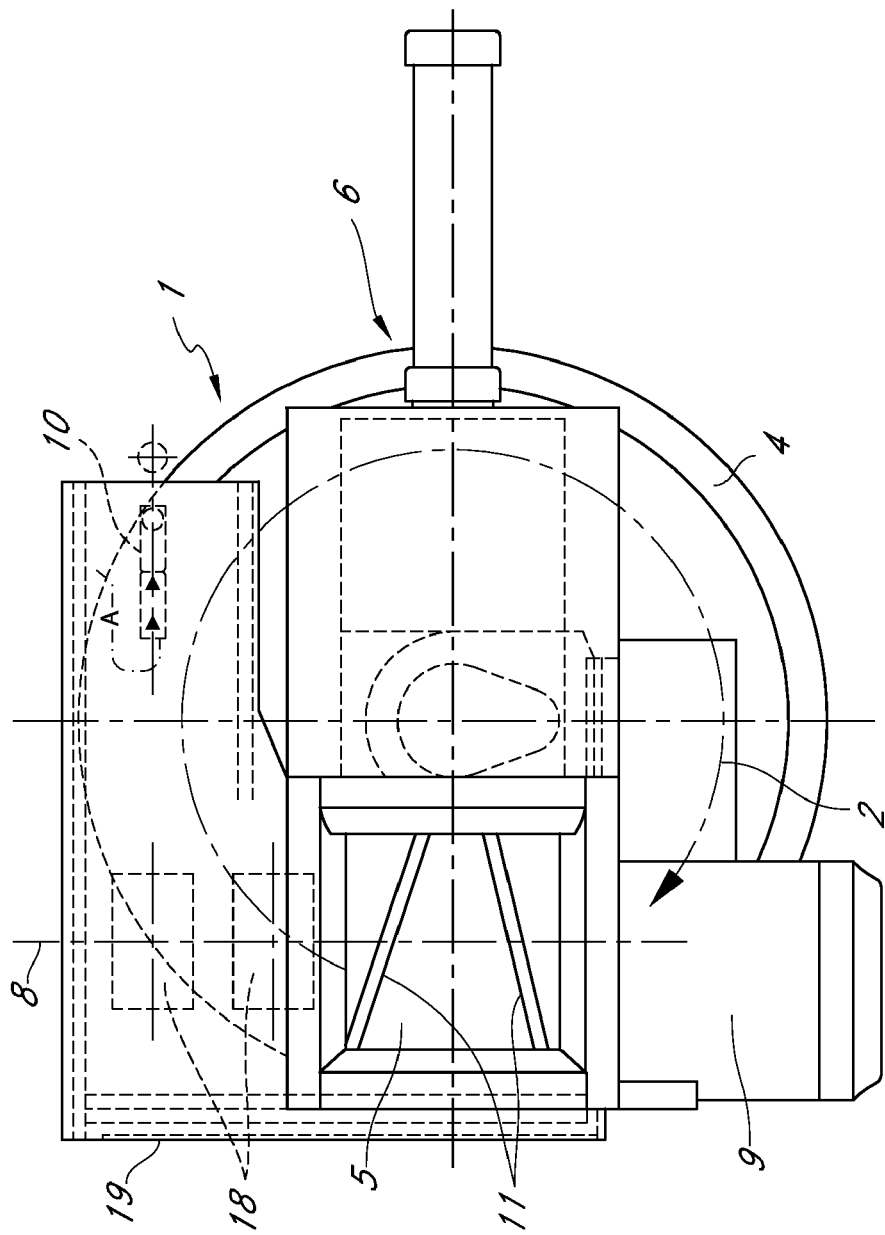
FIG. 1 shows a top view of a dosing apparatus.

A locking slide 6 is provided on the charge opening 5, which in the opened position allows bulk material to flow in which is supplied from a bunker or storage reservoir or funnel (not shown). Instead of the locking slide 6 it is also possible that discharge aids are arranged here too in order to ensure the delivery of the bulk material from a bulk material silo to the dosing apparatus 1. Two pivot bearings 18 are provided below the locking slide 6 for forming a swiveling axis 8 about which the housing 4 can swivel under the load of the bulk material. This swiveling axis 8 preferably extends through the centre (in a top view) of the upper charge opening 5 and the lower discharge opening 37 in order to reduce fault influences in the measurement of the momentary load by the supply and discharge of the bulk material.

A drive apparatus 9 is provided for driving the dosing rotors 3 and 33, which drive apparatus comprises in this case of an electromotor and a gear for example whose output opens into a vertical drive shaft 25 for both rotors 3 and 33. The drive apparatus 9 is mounted directly on the housing 4, so that it can follow the pivoting movements about the swiveling axis 8. During the pivoting movement about the swiveling axis 8 which is caused by the supply of material and the conveyance of the train of a bulk material along the measuring section 2, the housing 4 rests on a stationary load-sensing apparatus 19 which is connected in this case for example by a tow-bar 20 (cf. FIG. 3) with the housing 4 receiving the two dosing rotors 3 and 33. In this embodiment the load-sensing apparatus 10 is fastened to a frame 19 which is connected to the housing of the locking slide 6 which is also arranged in a stationary manner. A separate supporting frame for the load-sensing apparatus 10 can also be provided.

Different load cells can be used as load-sensing apparatuses 10. Detectors working in a pathless manner are preferred. These are extensible measuring strips, shear force detectors or the like. In this configuration the respective weight of the stream of material conveyed over the measuring section 2 is detected and the product of momentary load and conveying speed is formed for determining the throughput. In order to change the throughput or for setting the desired quantity, the speed of the drive apparatus 9 and thus the dosing rotors 3 and 33 is readjusted depending on the momentary load or desired conveying strength by means of a known control apparatus (not shown).

The dosing rotors 3 and 33 each comprise driving webs 11 which extend in a star-shaped manner and which cover at least a partial height of the inside height of the housing 4. A feed connection piece 12 is guided through the upper housing wall 22 (cf. FIGS. 2 and 3) of the housing 4, which connection piece comprises a lower outlet towards the chamber of the first dosing rotor 3 and through which the swiveling axis 8 extends in a central way. The star-like driving webs 11 of the respective rotor 3 and 33 are each connected here by an outside ring 14 (cf. FIG. 3) with each other, thus leading to a high stability of the rotors 3 and 33. Moreover, the outside ring 14 which is pulled up on the outside close to the upper housing wall 22 ensures that the bulk material which is supplied through the charge opening 5 in the feed connection piece 12 cannot migrate to the outside. The same applies to the lower dosing rotor 33 with a preferably identical arrangement.

The outside ring 14 is outwardly flanged in a preferable embodiment, so that the same revolves with low play with respect to the housing jacket 21. A circumferential gap is thus produced between the outside ring 14 and the housing jacket 21 in which finer particles of the bulk material can accumulate in order to be simultaneously conveyed by means of auxiliary driving means to the intermediate opening 7 in an intermediate wall 23 and then to the discharge opening 37. The auxiliary driving means are preferably formed by the outside ends of the driving webs 11, such that the outside ring 14 is only placed on the driving webs 11 for example. Notice must be taken that the discharge opening projects in the radial direction beyond the outside edge 14 and is thus in connection with the circumferential gap 16, so that bulk material which is also present in the circumferential gap falls downwardly at the discharge opening 37 and is thus co-detected concerning the momentary load in the measuring section 2. Moreover, there is a slight pressure above atmospheric in the circumferential gap 16 in the discharge region, so that the discharge is supported and tight packing of particles is inhibited. This can be supported by a blow-out apparatus.

Figure 2:
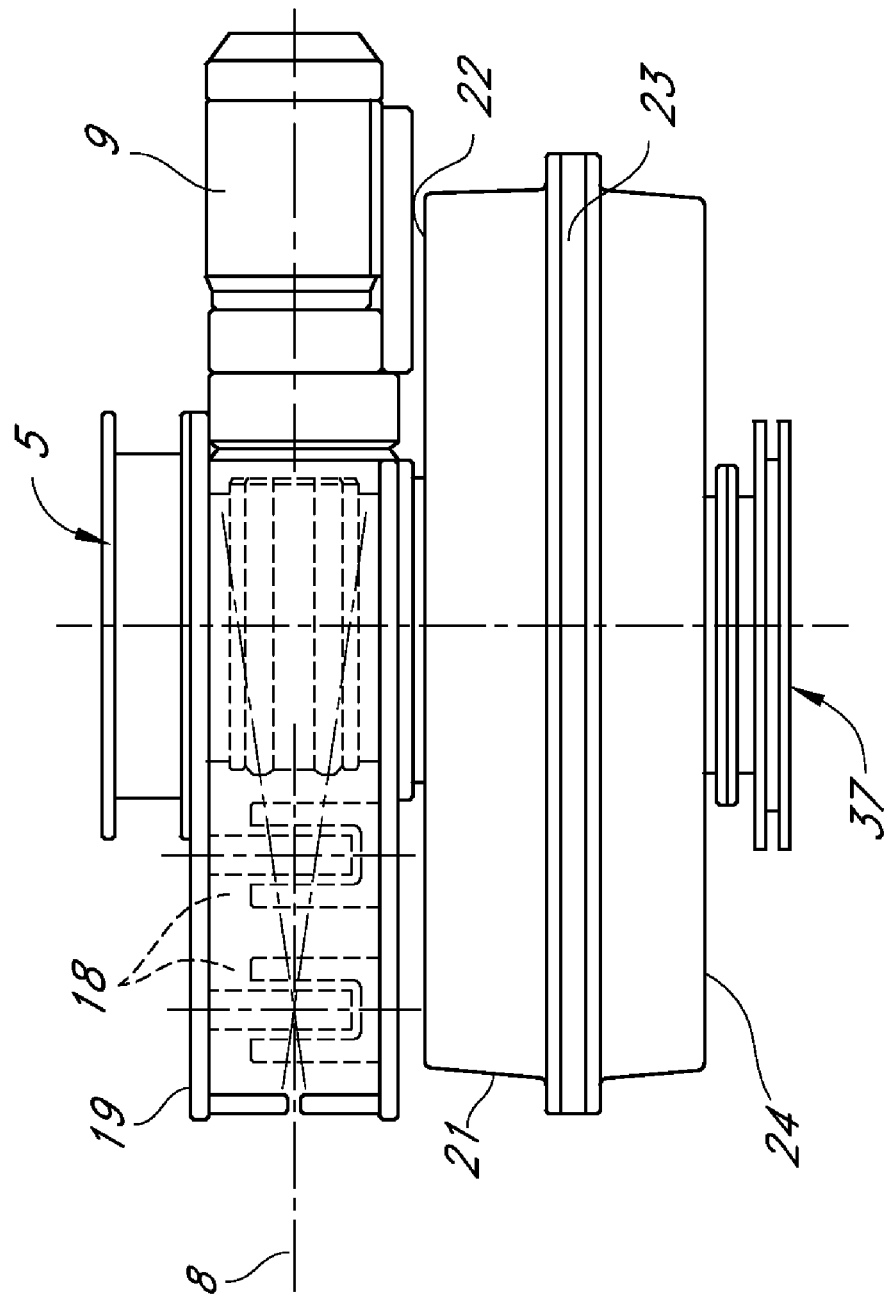
FIG. 2 shows a side view of the dosing apparatus.

FIG. 2 shows a side view of the dosing apparatus 1 which is turned by 90°. The progress of the swiveling axis 8 as formed by the pivot bearings 18 is shown in particular. Moreover, the illustration shows the configuration of the housing 4 with a housing jacket 21, an upper housing wall 22 and a lower housing wall 24. The housing 4 comprises an intermediate wall 23 approximately in the centre with the intermediate opening 7 (cf. FIG. 3). The intermediate wall 23 is slightly offset towards the upper housing wall 22, so that the chamber of the upper rotor 3 has a slightly lower height than that of the rotor 33. As a result of these different volumes a pressure reduction ("relief") is achieved and thus a controlled ejection of the bulk material to the intermediate opening 7 in the lower rotor 33 is achieved.

Figure 3:
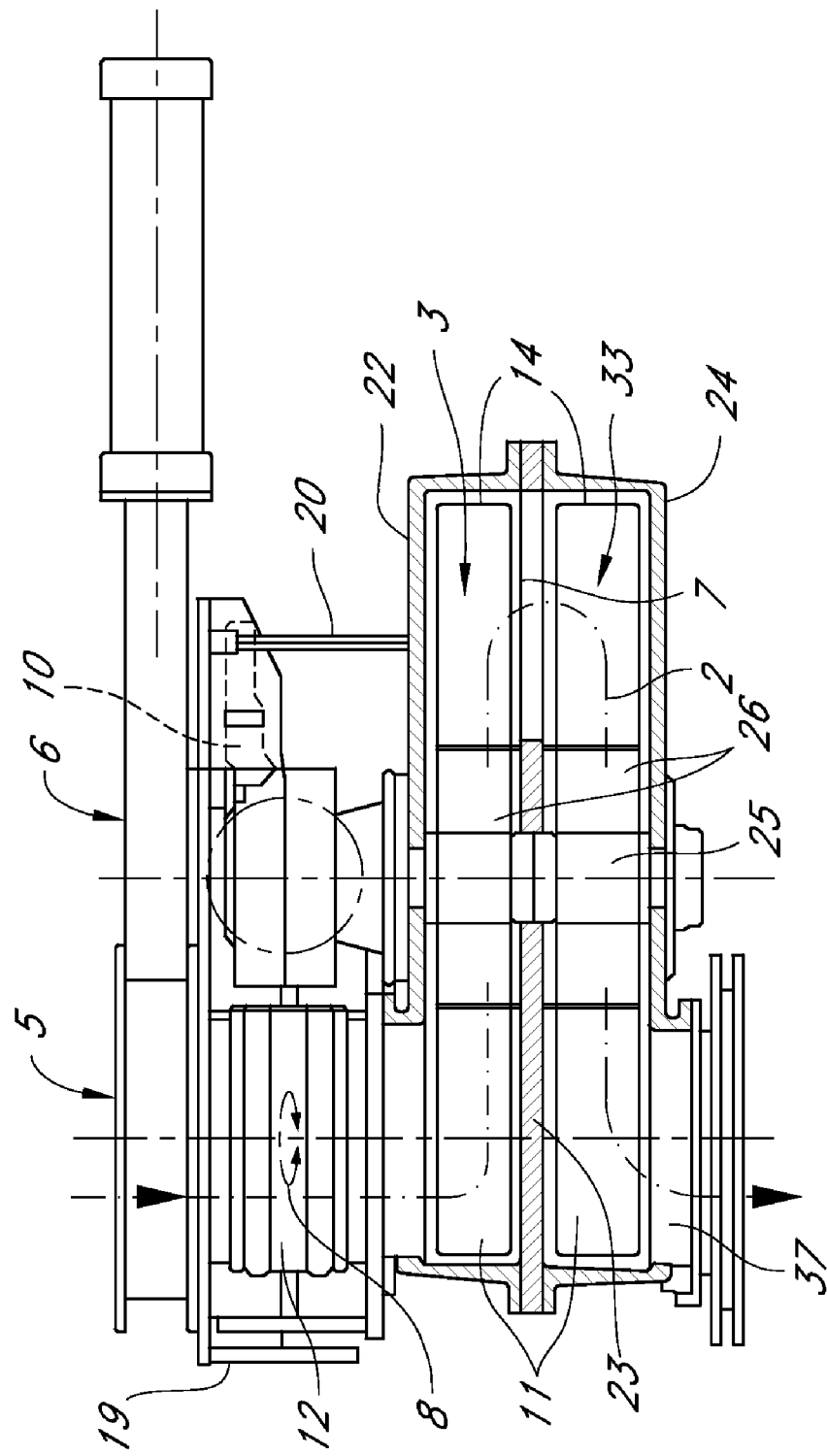
FIG. 3 shows a sectional view of the dosing apparatus.

FIG. 3 shows a partial sectional view of the dosing apparatus 1, with the star-like driving webs 11 being visible beneath the charge opening 5, which webs, when driven by the drive apparatus 9 placed on the upper side of the housing 4, convey the supplied bulk material along the measuring section 2 about approximately 180° to the intermediate opening 7 and then about a further 180° to the discharge opening 37. This leads to a momentary load on the half of the dosing apparatus 1 which faces to the right in this case, so that the load-sensing apparatus 10 which is arranged at a distance from the swiveling axis 8 is loaded inwardly via the tension rod 20. In order to achieve a higher lever length, the load-sensing apparatus 10 is arranged on the circumference of the housing 4. It can also be arranged further away or closer to the swiveling axis 8.

In addition to the components of the dosing apparatus 1 as have already been described, this sectional view also shows a central drive shaft 25 for driving both rotors 3 and 33, as also the rotor hubs 26 on which the respective driving webs 11 of the two rotors 3 and 33 are arranged in a star-like fashion. The driving webs 11 of the upper rotor 3 revolve in a closely fit manner between the cover wall 22 and the intermediate wall 23, whereas the lower rotor 33 revolves with a larger gap dimension relative to the intermediate wall 23 on the lower housing wall 24 in the same direction of rotation.

A flow of material is thus formed on the driving webs 11 during the rotary operation dosing apparatus 1 and said flow is guided to the discharge opening 37. This train-like accumulation of the flow of material via the driving webs 11 is also obtained by the feed connection piece 12 which is fastened in the upper housing wall 22 and is arranged as an elastic compensator.

As a result of the measuring section 2 of the two rotors 3 and 33 which is substantially longer than the ones known from known dosing apparatuses and is 360° in this case, a reduced pressure-impact configuration of the dosing apparatus 1 is thus obtained. This can be improved even further in that three or even four of such dosing rotors are arranged in a "stacked design" above one another on the same drive shaft 25. Notice must be taken that in addition to the exact radial alignment as shown herein, the driving webs 11 of the rotors 3 and 33 can also be provided with a configuration which is slightly curved or (in the conveying direction) slightly arched.

The rotational speed can also rise slightly from rotor 3 to rotor 33 (and optionally to subsequent further dosing rotors), e.g. by a planetary gear integrated for rotor 33, so that the thus produced quicker discharge towards the discharge opening 37 there will also be a controlled pressure reduction relative to the upper rotor 3 in order to thus counteract the "shooting tendency".

The invention claimed is:

1. A dosing apparatus for continuous, gravimetric dosing of bulk material, with a stream of material being conveyed with a first dosing rotor driven about a swiveling axis under determination of a momentary load over a measuring section from a charge opening to an offset intermediate opening, and with a load-sensing apparatus which detects the momentary load of the stream of material guided over the measuring section, and at least a second dosing rotor arranged on the swiveling axis with a discharge opening which is offset to the intermediate opening and wherein the intermediate opening is formed in a housing common to the first and at least second rotor and arranged therebetween and wherein the first dosing rotor revolves on an intermediate wall of the housing, wherein the intermediate wall comprises the intermediate opening, the dosing apparatus comprising one or more pivot bearings engaged with the housing such that the housing can swivel under load of the bulk material.

2. A dosing apparatus as claimed in claim 1, wherein the dosing rotors comprise substantially radially extending driving webs.

3. A dosing apparatus as claimed in claim 2, characterized in that the driving webs are connected at their radially outside ends with an outer ring.

4. A dosing apparatus as claimed in claim 3, characterized in that the outer ring of the dosing rotors has a slightly smaller diameter than a diameter of the housing thereby forming a circumferential gap.

5. A dosing apparatus as claimed in claim 1, characterized in that the first dosing rotor has a lower height than the second dosing rotor.

6. A dosing apparatus as claimed in claim 1, characterized in that the second dosing rotor is driven at a higher rotational speed than the first dosing rotor.

7. A dosing apparatus as claimed in claim 1, characterized in that the intermediate opening and the discharge opening are mutually offset by 180°.

8. A dosing apparatus as claimed in claim 1, characterized in that the charge opening and the discharge opening are mutually offset by 360° or more.

9. The dosing apparatus of claim 1, wherein the first dosing rotor is arranged above the second dosing rotor.

10. The dosing apparatus of claim 5, wherein the second dosing rotor defines a greater volume than the first dosing rotor such that the bulk material experiences a controlled pressure decrease passing from the first dosing rotor to the second dosing rotor.

* * * * *

UNITED STATES PATENT AND TRADEMARK OFFICE
CERTIFICATE OF CORRECTION

PATENT NO. : 7,581,659 B2  Page 1 of 1
APPLICATION NO. : 10/467725
DATED : September 1, 2009
INVENTOR(S) : Hans Wilhelm Häfner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this

Fourteenth Day of September, 2010

David J. Kappos
*Director of the United States Patent and Trademark Office*